(12) United States Patent
Nilsson et al.

(10) Patent No.: US 8,314,353 B2
(45) Date of Patent: Nov. 20, 2012

(54) KEYPAD FOR A MOBILE DEVICE

(75) Inventors: Bengt Krister Nilsson, Bjarred (SE); William Haywood Tolbert, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 265 days.

(21) Appl. No.: 12/573,198

(22) Filed: Oct. 5, 2009

(65) Prior Publication Data

US 2011/0079500 A1    Apr. 7, 2011

(51) Int. Cl.
*H01H 13/70*    (2006.01)
(52) U.S. Cl. .................................... 200/5 A; 200/517
(58) Field of Classification Search ............... 200/5 A, 200/516, 517; 341/22; 345/168, 169; 361/679.01–679.56; 455/575.1–575.8
See application file for complete search history.

(56) References Cited

U.S. PATENT DOCUMENTS

| | | | |
|---|---|---|---|
| 5,569,889 A * | 10/1996 | Bruner | 200/5 A |
| 5,587,875 A * | 12/1996 | Sellers | 361/679.13 |
| 5,767,464 A * | 6/1998 | Dyer et al. | 200/5 A |
| 5,768,094 A * | 6/1998 | Merkel | 361/679.13 |
| 5,894,117 A * | 4/1999 | Kamishima | 200/344 |
| 6,201,199 B1 | 3/2001 | Chew et al. | |
| 6,297,461 B1 * | 10/2001 | Kamishima | 200/5 A |
| 6,314,274 B1 * | 11/2001 | Kumagai | 455/90.3 |
| 6,590,565 B2 * | 7/2003 | Hosoya | 345/168 |
| 6,713,700 B2 * | 3/2004 | Hsu | 200/344 |
| 7,221,561 B2 * | 5/2007 | Pan et al. | 361/679.08 |
| 2009/0000936 A1 | 1/2009 | Steijner | |

FOREIGN PATENT DOCUMENTS

WO    2009/026405 A2    2/2009

OTHER PUBLICATIONS

International Search Report and Written Opinion issued in corresponding international patent application PCT/EP2010/005392 on Jan. 4, 2011.

* cited by examiner

*Primary Examiner* — Michael Friedhofer
(74) *Attorney, Agent, or Firm* — Edwards Wildman Palmer LLP; Peter F. Corless

(57) ABSTRACT

A keypad for a mobile device and a mobile device comprising the keypad, a first housing part and a second housing part are described.

9 Claims, 2 Drawing Sheets

KEYPAD FOR A MOBILE DEVICE

BACKGROUND OF THE INVENTION

The present invention relates to a keypad for a mobile device and a mobile device comprising the keypad.

BRIEF SUMMARY OF THE INVENTION

According to an embodiment of the present invention, a keypad for a mobile device is provided. The keypad comprises a dome sheet comprising at least one dome, and at least one key which is associated with the at least one dome. The at least one key is arranged to be moveable between a non-depressed position and a depressed position. The dome sheet is slideable in relation to the at least one key between a first position and a second position. The at least one key is configured such that the associated at least one dome is actuated by the at least one key when the at least one key is in its depressed position and the dome sheet is in its first position, and that the associated at least one dome is not actuated by the at least one key when the at least one key is in its depressed position and the dome sheet is in its second position. The at least one key may further be configured such that the associated at least one dome is not actuated by the at least one key when the at least one key is in its non-depressed position regardless of the position of the dome sheet.

In mobile devices, especially in for example mobile phones, thin keyboards are very desirable. Furthermore, especially in mobile phones comprising two housing parts which can be rearranged in relation to each other to cover a keyboard of the mobile phone, for example a so-called slider phone, a clamshell or a flip phone, a very thin keyboard is desirable to reduce an overall thickness of the mobile device. However, in use, protruding keys of a keyboard are desirable from an ergonomic point of view. Therefore, the above-described embodiment of a keypad for a mobile device provides a dome sheet which is slideable in relation to the keys between the first and the second position. In the first position each key of the keypad is arranged in relation to its associated dome of the dome sheet such that the dome can be actuated by the key. This operation mode may be used for example in a slider phone when the phone is in its expanded state and ready for using the keypad. In the second position of the dome sheet, the keys are arranged in relation to the associated domes such that the domes are not actuated by the keys when the keys are pressed down. This second position may be used in a slider phone when the slider phone is in its pushed-together arrangement, for example in its closed position. In this second position of the dome sheet, the keys may not be biased by the domes of the dome sheet and thus the keys do not protrude and therefore a very thin keyboard can be achieved in the second position of the dome sheet.

According to an embodiment, the at least one key is supported by a pivoting axis to be moveable between the depressed position and the non-depressed position. The at least one key may comprise a first area and a second area on a surface of the key facing the dome sheet. The key may be arranged such that the first area faces the associated dome in the first position of the dome sheet, and the second area faces the associated dome in the second position of the dome sheet. The first area may be configured such that it contacts and actuates the associated dome when the key is pressed. The second area may be configured such that it is spaced apart from the dome in the second position of the dome sheet such that it does not contact or actuate the associated dome regardless if the key is in its depressed or non-depressed position.

According to an embodiment, the dome sheet comprises at least one first lifting element associated with the at least one dome, and the at least one key comprises a second lifting element. The first and the second lifting elements cooperate such that the at least one key is lifted into the non-depressed position when the dome sheet is being moved from the second position to the first position. The first lifting element may comprise a protrusion on the dome sheet protruding in a direction towards the at least one key, and the second lifting element may be a sloped surface on a surface of the at least one key facing the dome sheet and being arranged to slidably contact the protrusion. The protrusion on the dome sheet may be a rib having a chamfered surface contacting the sloped surface of the at least one key. Furthermore, there may be more than one protrusions associated to each of the at least one keys and each of the at least one keys may accordingly provide more than one sloped surfaces on a surface of the at least one key facing the dome sheet. Especially, two protrusions and two corresponding sloped surfaces at each of the at least one keys may be provided, one protrusion on each side of the dome.

Furthermore, the at least one dome may function as the first lifting element, and the second lifting element may be a sloped surface on a surface of the at least one key facing the dome sheet and being arranged to slidably contact the associated at least one dome.

According to a further embodiment, the at least one key is biased into the non-depressed position by the associated at least one dome in the first position of the dome sheet, and the at least one key is not biased by the dome in the second position of the dome sheet.

According to an embodiment, a mobile device comprising a keypad, a first housing part, and a second housing part is provided. The first housing part and the second housing part are in relation to each other moveable between at least a first housing arrangement and a second housing arrangement. The mobile device may be a slider phone, a clamshell phone or a flip phone having an open or use position corresponding to the first housing arrangement and a closed position corresponding to the second housing arrangement. The keypad may be exposed to a user in the first housing arrangement and may be covered by an overlap of the first and the second housing parts in the second housing arrangement. The keypad may be housed in the first housing part and comprises a dome sheet comprising at least one dome, and at least one key associated with the at least one dome. The at least one key is arranged to be moveable between a non-depressed position and a depressed position. The dome sheet is slideable in relation to the at least one key between a first position and a second position. The at least one key is configured such that the associated at least one dome is actuated by the at least one key when the at least one key is in its depressed position and the dome sheet is in its first position, and that the associated at least one dome is not actuated by the at least one key when the at least one key is in its depressed position and the dome sheet is in its second position. The dome sheet is adapted to be moved from the first position to the second position in response to a movement of the first housing part and the second housing part from the first housing arrangement to the second housing arrangement.

According to an embodiment, the first housing part and the second housing part are in relation to each other slidably or pivotally moveable between the first housing arrangement and the second housing arrangement.

The mobile device may comprise a mobile phone, a personal digital assistant, a mobile navigation system or a mobile computer.

Although specific features described in the above summary and in the following detailed description are described in connection specific embodiments, it is to be understood that the features of the embodiments described can be combined with each other unless it is noted otherwise.

BRIEF DESCRIPTION OF THE DRAWINGS

Hereinafter, exemplary embodiments of the invention will be described with reference to the drawings.

DETAILED DESCRIPTION OF THE INVENTION

In the following, exemplary embodiments of the present invention will be described in detail. It is to be understood that the following description is given only for the purpose of illustrating the principles of the invention and is not to be taken in a limiting sense. Rather, the scope of the invention is defined only by the appended claims and not intended to be limited by the exemplary embodiments hereinafter.

It is to be understood that the features of the various exemplary embodiments described herein may be combined with each other unless specifically noted otherwise. Same reference signs in the various instances of the drawings refer to similar or identical components.

Figure 1:
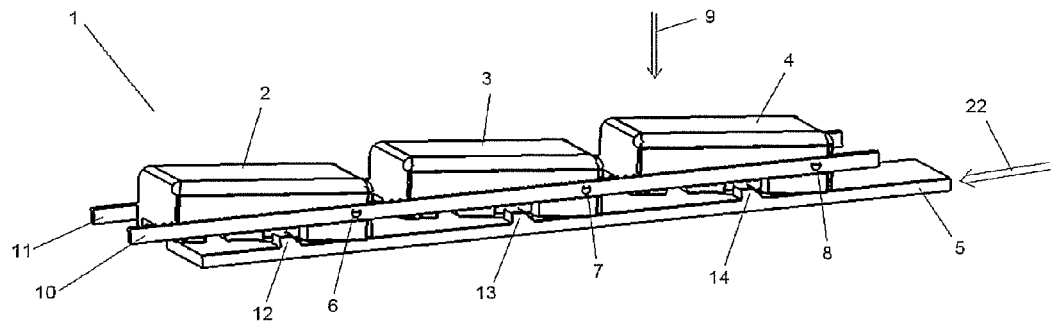
FIG. 1 shows a section of a keypad according to an embodiment of the present invention with the dome sheet in relation to the keys in a first position.

FIG. 1 shows a section of a keypad 1 comprising three keys 2-4 and a dome sheet 5. The number of three keys 2-4 is only an exemplary number and keypad 1 may comprise any number of keys depending on the application. Keypad 1 may be comprised in a mobile device, e.g. a mobile phone. Each of the keys 2-4 comprises a pivoting point 6-8 for keeping the keys 2-4 in position and to allow the keys 2-4 to be pivoted when being pressed in a direction of arrow 9. Two retaining elements 10 and 11 are provided to receive for example a pivoting axis at the pivoting points 6-8.

Figure 3:
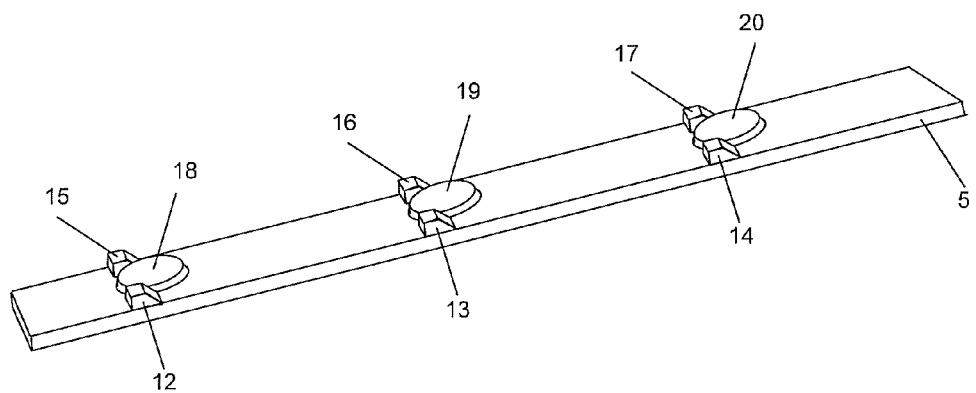
FIG. 3 shows a perspective view of a dome sheet according to an embodiment of the present invention.

As shown in FIG. 3, the dome sheet 5 comprises ribs 12-17 (first lifting elements) and domes 18-20. In the perspective view of FIG. 1 only the ribs 12-14 are visible, whereas the ribs 15-17 and the domes 18-20 are concealed by the keys 2-4. As can be seen from FIGS. 1 and 3, two ribs and one dome are associated with each key. In more detail, ribs 12 and 15 and dome 18 are associated with key 2, ribs 13 and 16 and dome 19 are associated with key 3, and ribs 14 and 17 and dome 20 are associated with key 4. The domes 18-20 are elastically deformable when being pressed in the direction of arrow 9. Thus, the domes 18-20 provide a pretensioning or biasing of the keys 2-4 to keep the keys 2-4 in a non-depressed position as shown in FIG. 1, and to receive a force from the keys 2-4 when any of the keys 2-4 is being pressed in the direction of arrow 9. In the arrangement shown in FIG. 1, the ribs 12-17 protrude into corresponding recesses 21 of the keys 2-4, as will be described later in connection with FIG. 5.

The dome sheet 5 is slidable in relation to the keys 2-4 in the direction indicated by arrow 22.

Figure 2:
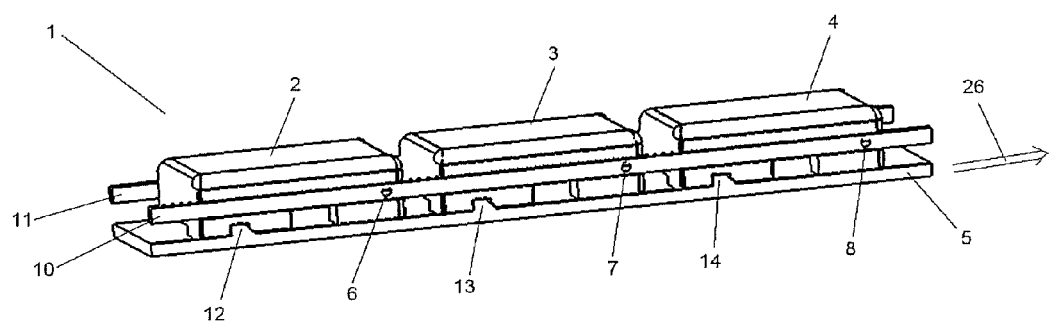
FIG. 2 shows the keypad of FIG. 1 with the dome sheet in relation to the keys in a second position.

FIG. 2 shows the keypad of FIG. 1, wherein the dome sheet 5 has been moved into the direction of arrow 22 of FIG. 1. Thus, in FIG. 1 the dome sheet 5 is in relation to the keys 2-4 in a first position and in FIG. 2 the dome sheet 5 is in relation to the keys 2-4 in a second position. In the second position the ribs 12-17 engage in corresponding recesses 23 of the keys 2-4, as will be described in the following in connection with FIG. 5.

Figure 4:
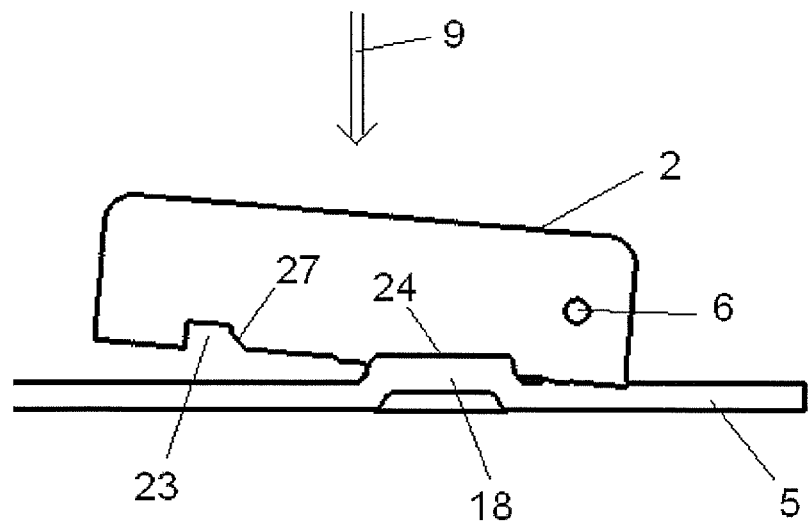
FIG. 4 shows a side view of a dome sheet and a key according to an embodiment of the present invention.
Figure 5:
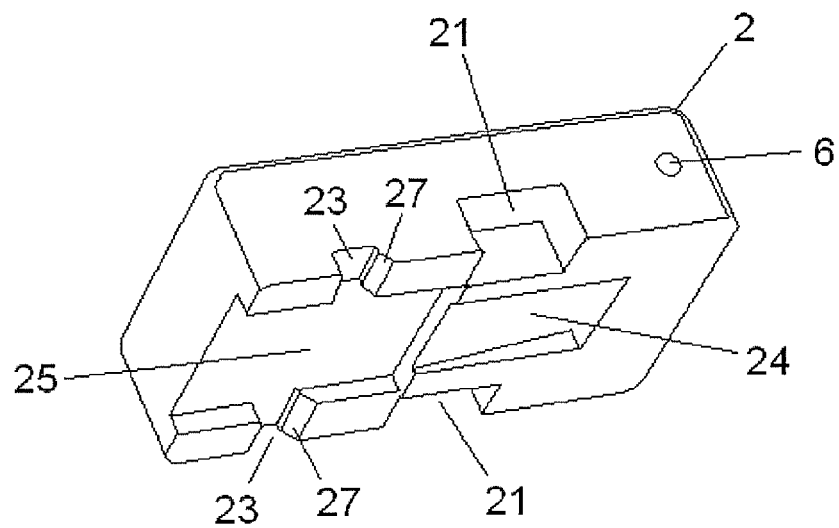
FIG. 5 shows a perspective view of a key according to an embodiment of the present invention.

FIG. 5 shows the structure of one of the keys 2-4 in more detail in a perspective view seen from a bottom side of the key 2. As can be seen from FIG. 5, on each side of the key 2 recesses 21 and 23 are provided to receive the corresponding ribs 12 and 15 of the dome sheet 5. The recesses 21 receive the ribs 12 and 15 in the first position of the dome sheet 5 as shown in FIG. 1, and recesses 23 receive the ribs 12 and 15 in the second position of the dome sheet 5 as shown in FIG. 2. Furthermore, FIG. 5 shows that the key 2 provides a dome landing area (first area) 24 which faces the associated dome 18 of the dome sheet 5 when the dome sheet 5 is in the first position (FIG. 1), and a dome recess area 25, which faces the dome 18 when the dome sheet 5 is in relation to the key 2 in its second position, as shown in FIG. 2. The dome recess area 25 provides enough space to accommodate the associated dome 18 completely, even when the key 2 is in its depressed position, without actuating the associated dome 18. The dome landing area 24 is configured such that the associated dome 18 contacts the dome landing area 24 and keeps the key 2 in its non-depressed position due to a pretension provided by the dome 18. FIG. 4 shows the key 2 and the associated dome 18 in the first position of the dome sheet 5. As can be seen, the key is lifted by the dome 18 into its non-depressed position due to the pretension provided by the dome 18, and may be actuated by a user by pressing the key 2 into the direction indicated by arrow 9 to actuate the associated dome 18.

As explained above, the keys 2-4 are pretensioned by the associated domes 18-20 into their non-depressed position when the dome sheet 5 is in its first position as indicated in FIG. 1. When the dome sheet is moved in the direction 22 into its second position shown in FIG. 2, the pretension from the domes 18-20 does not lift the keys 2-4 anymore, as the domes 18-20 are now accommodated in the dome recess areas 25 of the keys 2-4. Therefore, the keys "fall down" into their depressed position without actuating the associated key domes 18-20. By moving the dome sheet 5 from the second position shown in FIG. 2 back into the first position shown in FIG. 1 by moving the dome sheet into the direction of arrow 26, the keys 2-4 have to be lifted to be able to relocate the domes 18-20 together with the dome sheet 5 from the dome recess area 25 to the dome landing area 24. To support this lifting of the keys 2-4, the ribs 12-17 are provided and furthermore, each of the ribs as a sloped surface contacting a corresponding sloped surface 27 of the recesses 23 of the keys 2-4. When the dome sheet 5 is moved in the direction of arrow 26, the sloped surfaces of the ribs 12-17 glide along the sloped surfaces 27 of the keys 2-4 and thus lifting the keys 2-4 into their non-depressed position.

The above-described keypad may be for example used in a slider phone comprising a lower housing part (first housing part) and an upper housing part (second housing part) and having an open position (first housing arrangement) where the keypad in the lower housing part is exposed to a user of the mobile phone, and a closed position (second housing arrangement) where the keypad is covered by the upper housing part which was slid over the lower housing part for closing the phone. The movement of the dome sheet 5 from the first position to the second position may be coupled to a movement between the upper and lower housing parts of the slider phone. When the slider phone is moved into its closed position, the dome sheet 5 is moved into the second position shown in FIG. 2, and when the slider phone is moved into its open position, the dome sheet 5 is moved into its first position shown in FIG. 1. Therefore, in the closed position, a very thin keypad can be achieved, as the keys 2-4, shown in FIG. 2, protrude less than in the open position as shown in FIG. 1.

While exemplary embodiments have been described above, various modifications may be implemented in other embodiments. For example, instead of a slider phone, the above-described keypad can be advantageously used in a clamshell phone or a flip phone or in other devices, especially in mobile devices, for example personal digital assistants and so on. Furthermore, although in the above description, ribs 12-17 and corresponding sloped surfaces 27 are used to lift the keys 2-4 when moving the dome sheet 5 in the direction 26, the lifting of the keys 2-4 can be accomplished in various other ways, for example by a sloped surface arranged between the dome recess area 25 and the dome landing area 24 providing a lifting of the keys 2-4 when the associated dome 18-20 is moved from the dome recess area 25 to the dome landing area 24.

Finally, it is to be understood that all the embodiments described above are considered to be comprised by the present invention as it is defined by the appended claims.

What is claimed is:

1. A keypad for a mobile device, comprising:
    a dome sheet comprising at least one dome, and
    at least one key associated with the at least one dome,
    wherein the at least one key is arranged to be movable between a non-depressed position and a depressed position and the at least one key is pivotably supported so that the respective key is pivotable between the non-depressed position and the depressed position,
    wherein the dome sheet is slidable in relation to the at least one key between a first position and a second position,
    wherein the at least one key is configured such that the associated at least one dome is actuated by the at least one key when the at least one key is in its depressed position and the dome sheet is in its first position, and that the associated at least one dome is not actuated by the at least one key when the at least one key is in its depressed position and the dome sheet is in its second position,
    wherein the dome sheet includes at least one first lifting element associated with the at least one dome,
    wherein the at least one key includes a second lifting element,
    wherein the first and the second lifting elements cooperate such that the at least one key is lifted into the non-depressed position when the dome sheet is being moved from the second position to the first position, and
    wherein the first lifting element includes a protrusion on the dome sheet protruding in a direction towards the at least one key, and the second lifting element is a sloped surface on a side of the at least one key facing the dome sheet and being arranged to slidably contact the protrusion.

2. The keypad according to claim 1, wherein the at least one key is configured such that the associated at least one dome is not actuated by the at least one key when the at least one key is in its non-depressed position regardless of the position of the dome sheet.

3. The keypad according to claim 1, wherein the at least one key is supported by a pivoting axis to be movable between the depressed position and the non-depressed position.

4. The keypad according to claim 1, wherein the at least one key comprises a first area and a second area on a surface of the at least one key facing the dome sheet, the at least one key being arranged such that the first area faces the associated at least one dome in the first position of the dome sheet and the second area faces the associated at least one dome in the second position of the dome sheet.

5. The keypad according to claim 1, wherein the at least one key is biased into the non-depressed position by the associated at least one dome in the first position of the dome sheet, and
    wherein the at least one key is not biased in the second position of the dome sheet.

6. A mobile device comprising:
    a keypad,
    a first housing part, and
    a second housing part,
    wherein the first housing part and the second housing part are in relation to each other movable between at least a first housing arrangement and a second housing arrangement,
    wherein the keypad is housed in the first housing part and comprises:
    a dome sheet comprising at least one dome, and
    at least one key associated with the at least one dome,
    wherein the at least one key is arranged to be movable between a non-depressed position and a depressed position,
    wherein the dome sheet is slidable in relation to the at least one key between a first position and a second position,
    wherein the at least one key is configured such that the associated at least one dome is actuated by the at least one key when the at least one key is in its depressed position and the dome sheet is in its first position, and that the associated at least one dome is not actuated by the at least one key when the at least one key is in its depressed position and the dome sheet is in its second position,
    wherein the dome sheet is adapted to move from the first position to the second position in response to a movement of the first housing part and second housing part from the first housing arrangement to the second housing arrangement,
    wherein the dome sheet includes at least one first lifting element associated with the at least one dome,
    wherein the at least one key includes a second lifting element,
    wherein the first and the second lifting elements cooperate such that the at least one key is lifted into the non-depressed position when the dome sheet is being moved from the second position to the first position, and
    wherein the first lifting element includes a protrusion on the dome sheet protruding in a direction towards the at least one key, and the second lifting element is a sloped surface on a side of the at least one key facing the dome sheet and being arranged to slidably contact the protrusion.

7. The mobile device according to claim 6, wherein the first housing part and the second housing part are in relation to each other slidably or pivotably movable between the first housing arrangement and the second housing arrangement.

8. The mobile device according to claim 6, wherein the mobile device comprises a device selected from the group comprising a mobile phone, a personal digital assistant, a mobile navigation system, and a mobile computer.

9. A keypad for a mobile device, comprising:
    a dome sheet comprising at least one dome, and
    at least one key associated with the at least one dome, wherein the at least one key is arranged to be movable between a non-depressed position and a depressed position, wherein the dome sheet is slidable in relation to the at least one key between a first position and a second position and in the first position of the dome sheet, the dome is in contact with a lower surface of the respective key, and wherein the at least one key is configured such that the associated at least one dome is actuated by the at least one key when the at least one key is in its depressed position and the dome sheet is in its first position, and that the associated at least one dome is not actuated by the at least one key when the at least one key is in its depressed position and the dome sheet is in its second position, wherein the dome sheet includes at least one first lifting element associated with the at least one dome, wherein the at least one key includes a second lifting element, wherein the first and the second lifting elements cooperate such that the at least one key is lifted into the non-depressed position when the dome sheet is being moved from the second position to the first position, and wherein the first lifting element includes a protrusion on the dome sheet protruding in a direction towards the at least one key, and the second lifting element is a sloped surface on a side of the at least one key facing the dome sheet and being arranged to slidably contact the protrusion.

* * * * *